UNITED STATES PATENT OFFICE.

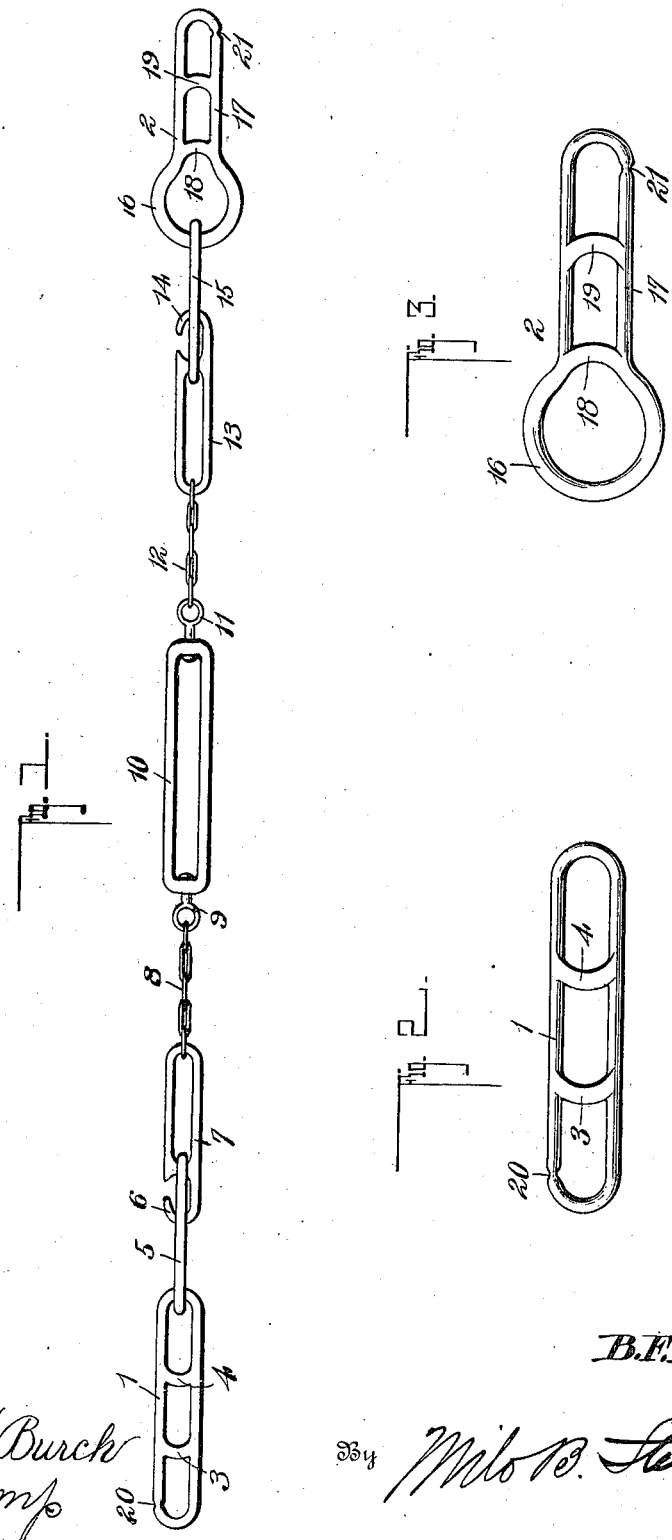

BENJAMIN F. BROCK, OF TUCUMCARI, TERRITORY OF NEW MEXICO.

TRACE-CHAIN.

974,857.

Specification of Letters Patent.

Patented Nov. 8, 1910.

Application filed October 20, 1909. Serial No. 523,576.

*To all whom it may concern:*

Be it known that I, BENJAMIN F. BROCK, a citizen of the United States, residing at Tucumcari, in the county of Quay and Territory of New Mexico, have invented certain new and useful Improvements in Trace-Chains, of which the following is a specification.

The present invention is an improvement in trace chains, and its object comprehends the production of an extremely simple and inexpensive article of the class specified which shall be comparatively noiseless in use, and capable of adjustment in point of length without the slack hanging down in a position where it is liable to become entangled with the check lines, and finally which shall include among its essential parts a link so constructed as to admit of its retaining the back and belly bands in proper position.

A structural embodiment of the invention is illustrated in the accompanying drawings, wherein—

Figure 1 is a plan view of the improved chain, and Figs. 2 and 3 are enlarged detail views of the adjusting links located at the ends thereof.

Reference being had to said drawings, and to the numerals marked thereon, 1 designates in a general manner the skeleton adjusting link at the front end of the chain, and 2 the corresponding link at the rear end thereof, said links being connected with the remaining or intermediate parts of the chain as hereinafter described. The link 1 is, as shown, in the form of a longitudinally elongated loop, the two side members of which are connected together at opposite points by a pair of slightly curved cross-bars 3 and 4. To the rear end of link 1 there is connected the front end of a link 5 whose length is preferably two-thirds that of the link 1. This link is of the ordinary skeleton construction, as its rear end is adapted for engagement under normal conditions, as shown, with the front end of a take-up link 7 formed with a forwardly-projecting hook 6, said link having its rear end connected by a series of short links 8 with a swivel-eye 9 provided upon the front end of the axially elongated band-link 10.

With reference to the band-link, it may be stated that its location in the chain is such that the back and belly bands (not shown) may be readily passed between the side members thereof and held in place in that manner, said link likewise being of skeleton construction, as may be assumed. To the rear end of this link there is attached a swivel-eye 11 which is connected by a series of short links 12, similar to the links 8, with the front end of a link 13, this link being similar in construction to the link 7 and provided at its rear end with a hook 14. To said end is connected the front end of a link 15, which connects the take-up link 13 with the rear adjusting link 2.

The afore-mentioned adjusting link 2, like the link 1, is of skeleton construction, and it comprises an approximately annular front portion 16, and a narrow rear or stem portion 17, the latter portion corresponding in the main to the front link 1 and having its side members connected by a pair of curved cross-bars 18 and 19. The ring portion 16 is adapted for engagement with the whiffletree (not shown), and the front adjusting link 1 is adapted, in like manner, to be engaged with the hame hook (not shown). Adjacent its front end, link 1 is preferably formed with a notch 20 which extends completely around one of its side members, there being a similar notch 21 formed upon link 2.

It is to be observed that there is no direct connection between the hooks 6 and 14, and the adjacent ends of the links 5 and 15. These hooks, on the contrary, are adapted for engagement with the bars 3 and 4 of link 1, and 18 and 19 of link 2, so as to shorten the chain. A similar effect may also be obtained by engaging either of the first-mentioned pair of bars with the hame hook. In taking up the chain by means of the front link 1, the rear end of link 7 is depressed, so as to raise the hook end thereof, whereupon said hook may be readily engaged with either of the bars 3 or 4. The operation is the same, where the rear link 2 is concerned, as will be apparent. It is also possible, during the take-up, to reverse the position of the links 1 and 2, the notched formations 20 and 21 enabling the hooks (which are rigid), to be engaged with the corresponding side members of the link.

The band-link 10, as already stated, serves to retain the back and belly bands in place, and its swivel-eyes 9 and 11 enable it to accommodate itself to any twisting movement of the chain without the bands themselves becoming twisted.

I claim:

1. A trace chain having at each end an adjusting link and a take-up link connected with the same, each take-up link being adapted for engagement with the adjacent adjusting link at various parts of the latter.

2. A trace chain having adjusting links at its ends, each of said links being provided with a plurality of cross-bars connecting the sides thereof, a take-up link adjacent each adjusting link and formed with a hook adapted for interchangeable engagement with said cross-bars, and a connecting link interposed between each adjusting link and the adjacent take-up link.

In testimony whereof I affix my signature, in presence of two witnesses.

BENJAMIN F. BROCK.

Witnesses:
J. R. DAUGHTRY,
A. B. SIMPSON.